United States Patent
Insley et al.

(10) Patent No.: US 7,899,680 B2
(45) Date of Patent: Mar. 1, 2011

(54) STORAGE OF ADMINISTRATIVE DATA ON A REMOTE MANAGEMENT DEVICE

(75) Inventors: Mark Insley, Sunnyvale, CA (US);
Michael Rubin, Palo Alto, CA (US);
Dan Gilson, San Jose, CA (US);
Pradeep Kalra, San Jose, CA (US);
Peter Snyder, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 1626 days.

(21) Appl. No.: 11/073,293

(22) Filed: Mar. 4, 2005

(65) Prior Publication Data

US 2006/0200361 A1    Sep. 7, 2006

(51) Int. Cl.
*G06F 9/44* (2006.01)
*G06F 9/45* (2006.01)

(52) U.S. Cl. .................. 705/1.1; 717/125; 714/20; 714/38; 714/39

(58) Field of Classification Search .............. None
See application file for complete search history.

(56) References Cited

U.S. PATENT DOCUMENTS

| | | | |
|---|---|---|---|
| 4,670,880 | A | 6/1987 | Jitsukawa et al. |
| 5,241,549 | A | 8/1993 | Moon et al. |
| 5,555,438 | A | 9/1996 | Blech et al. |
| 5,664,101 | A | 9/1997 | Picache |
| 5,761,683 | A * | 6/1998 | Logan et al. ............... 715/206 |
| 5,815,652 | A | 9/1998 | Ote et al. |
| 5,822,514 | A | 10/1998 | Steinz et al. |
| 5,881,078 | A | 3/1999 | Hanawa et al. |
| 6,170,067 | B1 * | 1/2001 | Liu et al. .................... 714/48 |
| 6,195,353 | B1 * | 2/2001 | Westberg ................ 370/230.1 |
| 6,216,226 | B1 * | 4/2001 | Agha et al. ................... 713/2 |
| 6,237,103 | B1 * | 5/2001 | Lam et al. .................. 713/330 |
| 6,253,300 | B1 * | 6/2001 | Lawrence et al. ........... 711/173 |

(Continued)

FOREIGN PATENT DOCUMENTS

EP    0 621 706    10/1994

(Continued)

OTHER PUBLICATIONS

Phillips Semiconductors, The I2C Bus Specification, Jan. 2000, Version 2.1-2000, pp. 6, 7, 10, 13-15.

(Continued)

*Primary Examiner*—Traci L Casler
*Assistant Examiner*—Sangeeta Bahl
(74) *Attorney, Agent, or Firm*—Perkins Coie LLP (57) ABSTRACT

According to an embodiment of the invention, a remote management device is integrated into a processing system, such as a filer or other storage server, and the remote management device and administrative data (such as console data) generated by the processing system are accessible even if the processing system becomes inoperable. The processing system includes a console port that outputs administrative data in the form of administrative data during system operation. The remote management device is accessible remotely, for example through a local area network (LAN) or a wide area network (WAN) such as the Internet, or a combination of networks. The remote management device intercepts the administrative data output by the console port and stores the data into memory on the remote management device.

28 Claims, 8 Drawing Sheets

U.S. PATENT DOCUMENTS

| | | | |
|---|---|---|---|
| 6,275,526 B1 | 8/2001 | Kim et al. | |
| 6,335,967 B1 | 1/2002 | Blomkvist et al. | |
| 6,446,141 B1 * | 9/2002 | Nolan et al. | 710/8 |
| 6,480,850 B1 * | 11/2002 | Veldhuisen | 707/9 |
| 6,502,088 B1 * | 12/2002 | Gajda et al. | 707/2 |
| 6,502,208 B1 * | 12/2002 | McLaughlin et al. | 714/25 |
| 6,507,929 B1 | 1/2003 | Durham et al. | |
| 6,574,518 B1 * | 6/2003 | Lounsberry et al. | 700/90 |
| 6,586,911 B1 | 7/2003 | Smith | |
| 6,645,077 B2 * | 11/2003 | Rowe | 463/42 |
| 6,651,190 B1 | 11/2003 | Worley et al. | |
| 6,690,733 B1 | 2/2004 | Baumgartner et al. | |
| 6,697,962 B1 | 2/2004 | McCrory et al. | |
| 6,728,908 B1 | 4/2004 | Fukuhara et al. | |
| 6,920,502 B2 | 7/2005 | Araujo et al. | |
| 6,925,531 B2 | 8/2005 | Konshak et al. | |
| 6,976,058 B1 | 12/2005 | Brown et al. | |
| 7,003,563 B2 | 2/2006 | Leigh et al. | |
| 7,024,551 B2 | 4/2006 | King et al. | |
| 7,114,102 B2 | 9/2006 | Chan et al. | |
| 7,225,327 B1 | 5/2007 | Rasmussen et al. | |
| 7,234,051 B2 | 6/2007 | Munguia et al. | |
| 7,257,741 B1 * | 8/2007 | Palenik et al. | 714/43 |
| 7,466,713 B2 | 12/2008 | Saito | |
| 7,487,343 B1 | 2/2009 | Insley et al. | |
| 7,584,337 B2 * | 9/2009 | Rowan et al. | 711/162 |
| 7,805,629 B2 | 9/2010 | Insley et al. | |
| 2001/0056483 A1 | 12/2001 | Davis | |
| 2002/0059627 A1 | 5/2002 | Islam et al. | |
| 2002/0078231 A1 * | 6/2002 | Chang et al. | 709/238 |
| 2002/0129305 A1 * | 9/2002 | Ahrens et al. | 714/57 |
| 2002/0133581 A1 | 9/2002 | Schwartz et al. | |
| 2002/0156840 A1 * | 10/2002 | Ulrich et al. | 709/203 |
| 2003/0008805 A1 | 1/2003 | Honma et al. | |
| 2003/0033361 A1 * | 2/2003 | Garnett et al. | 709/203 |
| 2003/0061320 A1 | 3/2003 | Grover et al. | |
| 2003/0088655 A1 | 5/2003 | Leigh et al. | |
| 2003/0088805 A1 | 5/2003 | Majni et al. | |
| 2003/0163651 A1 * | 8/2003 | Jain et al. | 711/147 |
| 2003/0200266 A1 * | 10/2003 | Henry | 709/206 |
| 2004/0093592 A1 * | 5/2004 | Rao | 717/168 |
| 2004/0133643 A1 * | 7/2004 | Warren et al. | 709/206 |
| 2004/0136720 A1 | 7/2004 | Mahowald et al. | |
| 2004/0177178 A1 | 9/2004 | Gregg et al. | |
| 2004/0215948 A1 * | 10/2004 | Abbey et al. | 713/1 |
| 2005/0021722 A1 | 1/2005 | Metzger | |
| 2005/0033952 A1 | 2/2005 | Britson | |
| 2005/0044170 A1 | 2/2005 | Cox et al. | |
| 2005/0044207 A1 | 2/2005 | Goss et al. | |
| 2005/0125118 A1 | 6/2005 | Chalker et al. | |
| 2005/0129035 A1 | 6/2005 | Saito | |
| 2005/0144493 A1 | 6/2005 | Cromer et al. | |
| 2005/0165989 A1 | 7/2005 | Kim | |
| 2005/0188071 A1 | 8/2005 | Childress et al. | |
| 2005/0193021 A1 | 9/2005 | Peleg | |
| 2005/0283606 A1 | 12/2005 | Williams | |
| 2005/0288828 A1 | 12/2005 | Claseman | |
| 2005/0289548 A1 * | 12/2005 | Farchi et al. | 718/101 |
| 2006/0039468 A1 | 2/2006 | Emerson et al. | |
| 2006/0095224 A1 | 5/2006 | Lambert | |
| 2006/0156054 A1 * | 7/2006 | Brown et al. | 714/4 |
| 2006/0179184 A1 | 8/2006 | Fields et al. | |
| 2006/0200471 A1 | 9/2006 | Holland et al. | |

FOREIGN PATENT DOCUMENTS

| | | |
|---|---|---|
| JP | 58181395 | 10/1983 |
| WO | WO-03023561 | 3/2003 |

OTHER PUBLICATIONS

Co-pending U.S. Appl. No. 11/073,342, filed Mar. 4, 2005.
Co-pending U.S. Appl. No. 11/073,045, filed Mar. 4, 2005.
Co-pending U.S. Appl. No. 11/074,229, filed Mar. 4, 2005.
Co-pending U.S. Appl. No. 11/073,260, filed Mar. 4, 2005.
Notice of Allowance mailed Mar. 1, 2010 Co-pending U.S. Appl. No. 11/073,045, filed Mar. 4, 2005.
Notice of Allowance mailed Dec. 31, 2009 in Co-pending U.S. Appl. No. 11/073,045, filed Mar. 4, 2005.
Notice of Allowance Mailed Oct. 28, 2008 in Co-pending U.S. Appl. No. 11/073,260, filed Mar. 4, 2005.
Notice of Allowance Mailed Jul. 15, 2008 in Co-pending U.S. Appl. No. 11/073,260, filed Mar. 4, 2005.
Final Office Action mailed Jul. 23, 2009 in Co-pending U.S. Appl. No. 11/073,342, filed Mar. 4, 2005.
Final Office Action mailed Feb. 19, 2009 in Co-pending U.S. Appl. No. 11/073,045, filed Mar. 4, 2005.
Final Office Action mailed Apr. 11, 2008 in Co-pending U.S. Appl. No. 11/073,045, filed Mar. 4, 2005.
Final Office Action Mailed Feb. 3, 2010 in Co-pending U.S. Appl. No. 11/074,229, filed Mar. 4, 2005.
Final Office Action Mailed Feb. 25, 2009 in Co-pending U.S. Appl. No. 11/074,229, filed Mar. 4, 2005.
Final Office Action Mailed Mar. 31, 2008 in Co-pending U.S. Appl. No. 11/074,229, filed Mar. 4, 2005.
Non-Final Office Action mailed Dec. 17, 2008 in Co-pending U.S. Appl. No. 11/073,342, filed Mar. 4, 2005.
Non-Final Office Action mailed Jul. 2, 2008 in Co-pending U.S. Appl. No. 11/073,342, filed Mar. 4, 2005.
Non-Final Office Action mailed Jul. 6, 2009 in Co-pending U.S. Appl. No. 11/073,045, filed Mar. 4, 2005.
Non-Final Office Action mailed Aug. 19, 2008 in Co-pending U.S. Appl. No. 11/073,045, filed Mar. 4, 2005.
Non-Final Office Action mailed Dec. 7, 2007 in Co-pending U.S. Appl. No. 11/073,045, filed Mar. 4, 2005.
Non-Final Office Action Mailed Aug. 13, 2009 in Co-pending U.S. Appl. No. 11/074,229, filed Mar. 4, 2005.
Non-Final Office Action Mailed Aug. 18, 2008 in Co-pending U.S. Appl. No. 11/074,229, filed Mar. 4, 2005.
Non-Final Office Action Mailed Oct. 30, 2007 in Co-pending U.S. Appl. No. 11/074,229, filed Mar. 4, 2005.
Non-Final Office Action Mailed Feb. 5, 2008 in Co-pending U.S. Appl. No. 11/073,260, filed Mar. 4, 2005.
Non-Final Office Action Mailed Jul. 26, 2007 in Co-pending U.S. Appl. No. 11/073,260, filed Mar. 4, 2005.
Office Action received in co-pending U.S. Appl. No. 11/073,342; mailed Dec. 3, 2009.
PCT International Search Report and Written Opinion for PCT/US2006/007287; Intl Filng Date: Feb. 28, 2008; Mailing Date: Jul. 6, 2006 (11 pages).
PCT International Search Report and Written Opinion for PCT/US2006/007231, Int'l filing date: Feb. 28, 2006; Mailing date: Aug. 8, 2006 (10 pages).
Kistler, M. et al., "Console over Ethernet", IBM (2003) pp. 1-16.
Final Office Action mailed May 25, 2010 in Co-Pending U.S. Appl. No. 11/073,342, filed Mar. 4, 2005.
Non-Final Office Action Mailed Jul. 2, 2010 in Co-Pending U.S. Appl. No. 11/074,229, filed Mar. 4, 2005.
Notice of Allowance Mailed Jul. 20, 2010 in Co-Pending U.S. Appl. No. 11/073,045, filed Mar. 4, 2005.

* cited by examiner

STORAGE OF ADMINISTRATIVE DATA ON A REMOTE MANAGEMENT DEVICE

FIELD

The present invention generally relates to remote system management and specifically to storing administrative data on a remote management device.

BACKGROUND

A network appliance is a processing system that may be connected to a network to provide service to other devices over the network. A file server, or filer, is an example of a network appliance. A filer is a form of storage server which provides file storage and file access to remote clients that request access to the data storage. Another type of storage server, which may be implemented as an appliance, is one which provides clients with block-level access to stored data, rather than file-level access. Such a server can be used in a storage area network (SAN), for example, to provide an interface between clients and mass storage devices.

Filers, other storage servers, and other types of appliances must be reliable to prevent data loss and to provide prompt and accurate data service to clients. If there is a fault with the appliance, the appliance may cease operating and any data maintained by the appliance may become inaccessible to local or remote users. It is therefore advantageous to quickly resolve any fault with an appliance to make the appliance available and reduce system downtime.

To facilitate diagnosis of faults and other management functions, an appliance such as a filer may include a console port, through which the appliance can output status information and data regarding the activities of the appliance (hereinafter collectively called "administrative data"), to a separate administrative console. The administrative data may include system messages generated by the firmware and operating system (OS) of the appliance. For example, when the appliance is booting, the firmware may output messages indicating that certain components (e.g., memories, processors, interfaces) have been tested, and what the results of those tests are. Other administrative data could be outputted by the operating system, for example, messages during operation indicating that a certain memory has experienced an error, or that a certain component (e.g., network interface) has been activated. Administrative data also could include reports on the activities of memories and attached storage such as hard drives, or could list attempted and successful remote accesses to the appliance. The administrative data report the activities of the appliance such that a system administrator could diagnose an error or monitor the appliance by referring to the administrative data.

The appliance may output the administrative data in the form of console logs that indicate the activities of certain systems of the appliance. A local administrative terminal (or console) may be connected to the console port using a serial cable, to receive the administrative data and to perform other management functions on the appliance. The local administrative terminal may use the administrative data to monitor activity on the appliance. Multiple administrative terminals may be connected through a terminal concentrator, which may also be connected through a local area network (LAN) or wide area network (WAN, such as the Internet) to allow remote access of the administrative data. The terminals connected through the console port can receive real-time status information about the appliance.

A remote management device may be incorporated into an appliance. The remote management device is a separate processing system physically integrated into the appliance that continues to operate independent of any error that may disable the appliance. The remote management device allows a remote user to remotely access certain aspects of the appliance when the appliance is not otherwise available. For example, the remote management device allows a remote user to make configuration changes if necessary to make the appliance functional. The remote management device also allows a remote user to intercept the administrative data outputted by the console port of the appliance.

Diagnosing an error condition that causes a service disruption of a network appliance such as a filer may require inspection of the administrative data. However, in the known prior art, if the appliance is inoperable, the administrative data are no longer generated, and the appliance cannot be remotely accessed. Further, previously generated administrative data streams may be useful when diagnosing error conditions. Therefore, what is needed is a way to access administrative data of an appliance even when the appliance is inoperable, and a way to store and remotely access the stored administrative data.

SUMMARY

The present invention includes a method for remotely monitoring a processing system. In the method, administrative data is received from the processing system at a remote management device. The remote management device is coupled locally to the processing system to allow remote management of the processing system. At least a portion of the administrative data is stored in a memory in the remote management device, and the administrative information in the memory is made remotely available.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein is a method and apparatus for storing and accessing status information stored on a remote management device, and a method and apparatus for transmitting the status information to a remote administrator. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a remote management device is integrated into a processing system, such as a filer or other storage server, and the remote management device and administrative data (such as console data) generated by the processing system are accessible even if the processing system becomes inoperable. The processing system includes a console port that outputs status information in the form of administrative data during system operation. The remote management device is accessible remotely, for example through a local area network (LAN) or a wide area network (WAN) such as the Internet, or a combination of networks. The remote management device intercepts the administrative data output by the console port and stores the data into memory on the remote management device. According to another embodiment, each byte (or other denomination) of administrative data are appended to a metadata byte, which indicates whether the administrative data were generated by the system's firmware or by the system's operating system. In the event the appliance experiences a failure, the administrative data may be transmitted to a remote administrator to diagnose the error that caused the failure. For example, the stored administrative data may be e-mailed to the administrator when the appliance reboots.

Figure 1:
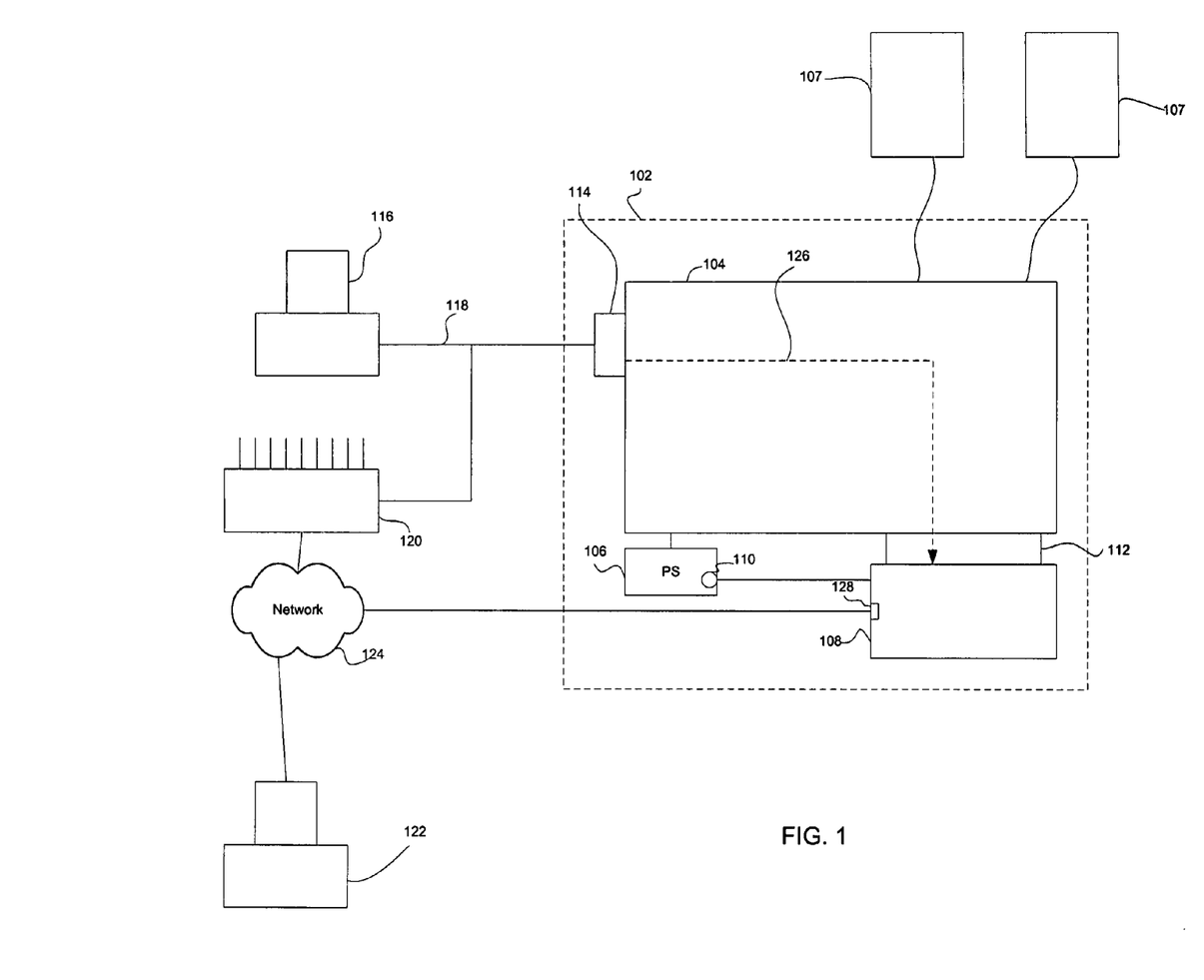
FIG. 1 illustrates a network configuration to allow remote management of an appliance according to one embodiment of the invention.

FIG. 1 illustrates a network configuration that allows remote management of an appliance according to one embodiment of the invention. An appliance 102 is a processing system that can be made available over a network to provide service to remote users. The appliance 102 is connected to one or more clients 107, typically via a network such as a LAN, WAN, or a combination of networks (not shown), to provide storage service or other services. The appliance 102 may be, for example, a storage server, such as a NetApp® Filer, NetCache®, or NearStore®, by Network Appliance® of Sunnyvale, Calif. The appliance 102 includes a motherboard 104. The motherboard 104 includes one or more processors, memories, input/output controllers, etc. (not shown), necessary for the operation of the appliance 102. The motherboard 104 is powered by a power supply 106. The details of these components are not germane to the present invention.

A remote management device, such as a remote management module (RMM) 108 is coupled locally to the appliance 102, and may be, for example, within the appliance 102. The RMM 108 may be a remote LAN module (RLM) that is accessible over a local network, or any other type of remotely accessible management device. The RMM 108 may be, for example, a daughtercard on the motherboard 104. The motherboard 104 and RMM 108 may also be cards located on a backplane in the same chassis. According to another embodiment, the RMM 108 may also be integrated into the motherboard 104. The appliance 102 includes an operating system to control operation of the appliance 102. The operating system is stored in memory on the motherboard and executed by the processor(s) of the motherboard 104. The appliance also includes firmware, such as boot firmware. The RMM 108 has its own independent processor, memory, and operating system, as described below. The operating system of the RMM 108 may be, for example, a version of the Linux operating system.

According to one embodiment, the RMM 108 is powered by standby power 110 of the power supply 106. Standby power 110 is available even when the appliance 102 is not powered on, so that the RMM 108 always has power available to it. The RMM 108 connects to the motherboard 104 through an RMM-Appliance interface 112. The RMM-Appliance connector transmits data from the appliance 102 to the RMM 108.

A console port 114 on the motherboard 102 outputs administrative data. The administrative data includes status information generated by the appliance 102 during operation. The status information typically comprises system messages generated by firmware or the operating system of the appliance 102, but may also include any information about the appliance 102, and may include console data. For example, the status information may include system messages indicating that system memory has not properly initialized, or that its total size is being misreported. The administrative data are typically stored in a memory of the RMM 108 as console logs, which include a list of messages generated by the appliance 102.

The console port 114 allows an administrative terminal (or console) 116 to access the administrative data generated by the appliance 102 using a serial cable 118. The terminal 116 must be local to the appliance 102 in order to access the administrative data in this manner. A terminal concentrator 120 may also be connected to the console port 114. The terminal concentrator 120 allows several terminals to access the console port 114, for example, a terminal 122 through a network 124. The network 124 may be an Internet protocol (IP) based network. The administrative data are stored by the RMM 108 even when no terminal 116 or 122 is attached to the appliance 102.

Figure 2:
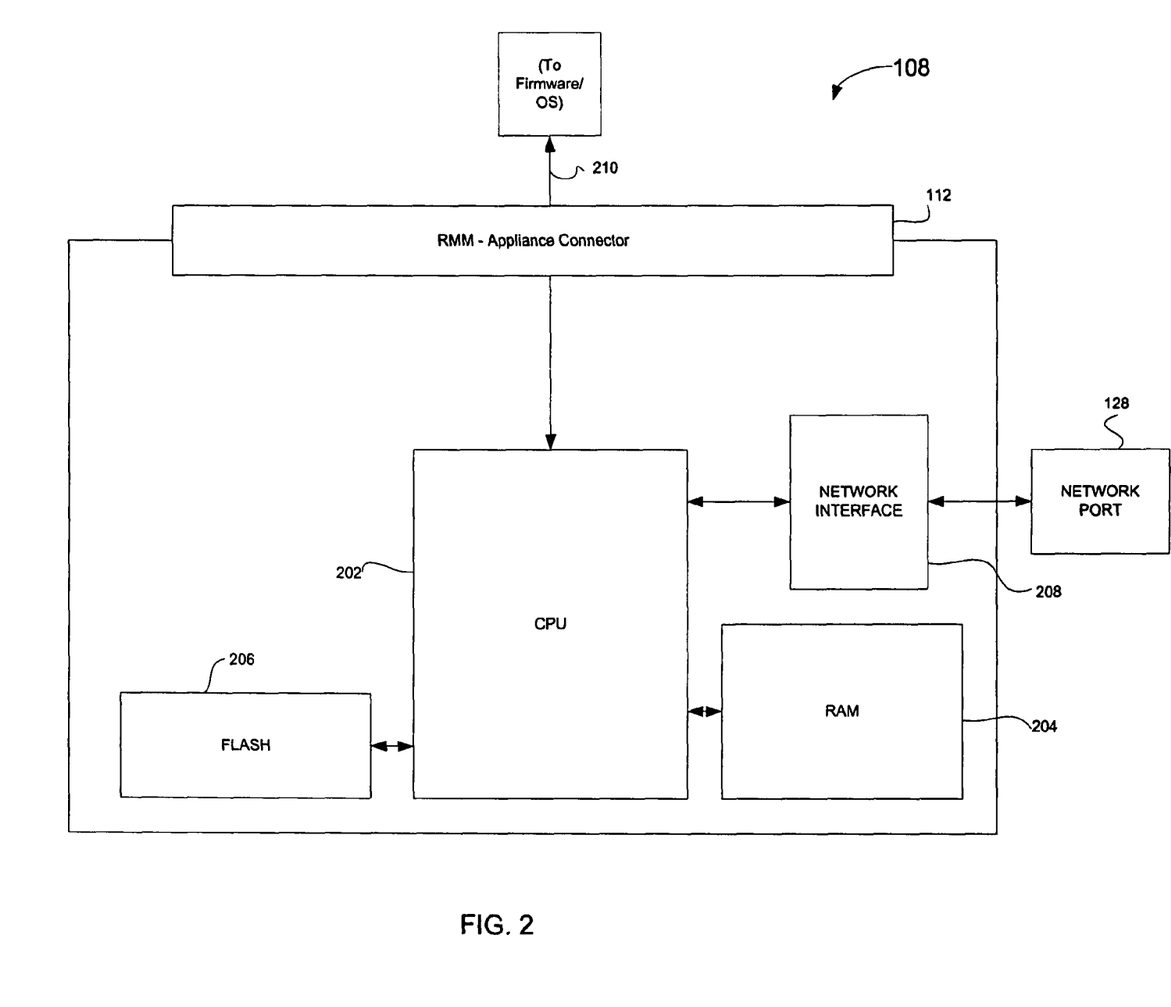
FIG. 2 illustrates a remote management module (RMM) according to one embodiment of the invention.

The RMM 108 receives administrative data from the appliance 102 through a serial connection 126. The serial connection 126 receives administrative data from the firmware, operating system, or other subsystem that generates it. The serial connection 126 is routed through the appliance-RMM connector 112. The RMM also has a network port 128. The network port 128 may be an RJ-45 Ethernet or other suitable connection. The network port 128 allows the RMM 108 to be remotely available to the administrative terminal 122 over the network 124. The network 124 may be, for example, a LAN, WAN, or other type of network or combination of networks FIG. 2 illustrates the RMM 108 according to one embodiment of the invention. The RMM 108 includes a central processing unit (CPU) 202, random access memory (RAM) 204, flash memory 206, network interface 208, and the RMM-Appliance interface 112. The RMM 108 may also include other components, such as a temperature sensor, other interfaces, additional memories, etc.

According to one embodiment, the CPU 202 may be an IBM® PowerPC® 405GP or 405GPr processor, which have an internal Ethernet interface and two serial universal asynchronous receiver-transmitters (UARTs). The UARTs may make a serial connection with the appliance 102. Other processors may also be used, and external input/output devices and interfaces may be used.

The flash memory 206 may store the RMM 108's operating system. According to one embodiment the RMM's operating system is a simplified Linux kernel. The RAM 204 may be any type of RAM, such as synchronous dynamic RAM (SDRAM), dynamic RAM (DRAM), static RAM (SRAM), etc. According to one embodiment of the invention, administrative data generated by the appliance 102 is stored in the RAM 204.

A serial link 210 between the CPU 202 and the appliance 102 is used to transmit data between the firmware and the operating system and the RAM 204. The serial link may be a serial UART connection, such as provided by the UARTs of the CPU 202 described above. The administrative data transmitted over the serial link 210 may also be multiplexed with other data that may be useful to the RMM 108, such as heartbeats (a signal that indicates the appliance 102 is still operating), configuration data, objects, etc. In other embodiments, the serial link 210 may be any type of communications link, such as RJ-45 Ethernet, universal serial bus (USB), peripheral control interface (PCI), etc.

The network interface 208 is connected to the network port 128, which may be an RJ-45 Ethernet port or other networking port. The network port 128 allows a terminal, such as the terminal 122, to be locally or remotely connected to the RMM 108 over the network 124. The network port 128 makes the RMM 108 remotely available so that a remote administrator may examine the administrative data generated by the appliance 102 and diagnose any errors remotely. Because the RMM 108 can operate even when the appliance is inoperable (assuming the RMM 108 has standby power), the administrative data are generally available to the terminal 122 even when the appliance 102 is inoperable.

Figure 3:
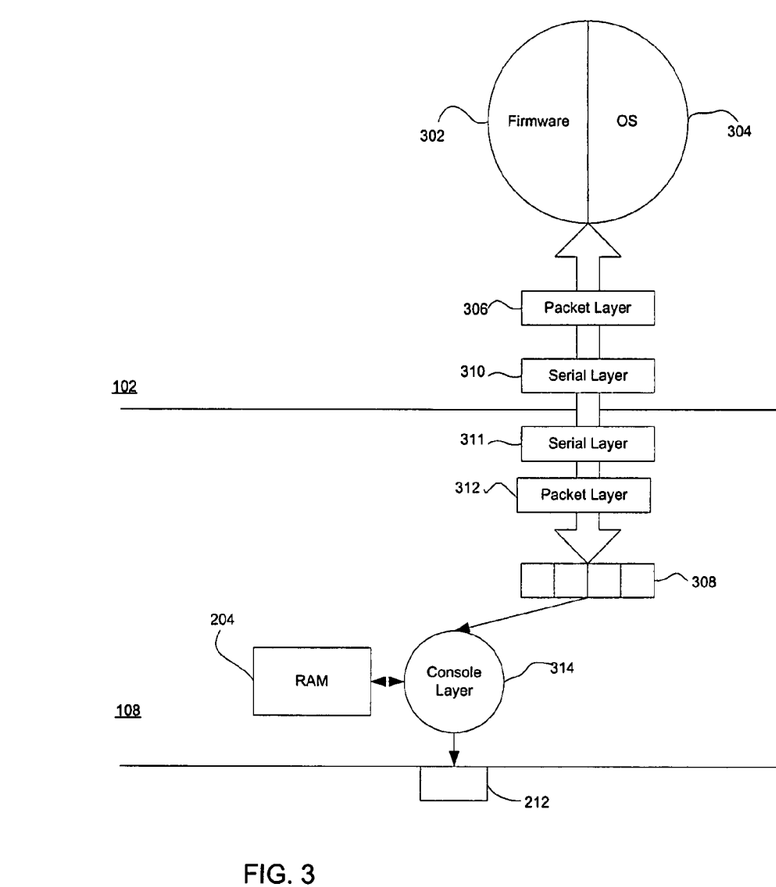
FIG. 3 illustrates the interface between the RLM and the appliance.

FIG. 3 illustrates the interface between the RMM 108 and the appliance 102. Administrative data are generated by firmware 302 and an operating system (OS) 304. The firmware 302 operates the appliance 102 during the preboot period of the appliance 102's operation. When the appliance 102 is booted, the firmware 302 is initially loaded, and the firmware 302 performs system initialization and other tasks before passing control over to the OS 304. During their operation, the firmware 302 and OS 304 output status information in the form of administrative data through a serial connection to the console port 114 (e.g., through connector 112). The serial connection 126 intercepts the administrative data outputted by the firmware 302 and the operating system 304 and transmits the data over the serial link 210 to the RMM 108.

In one embodiment, the administrative data are packetized before being transmitted to the RMM 108. A packet layer 306 adds metadata to the administrative data, creating packets 308. The metadata, according to one embodiment, is a single byte that indicates that the attached console byte is either from the firmware 302 or from the OS 304. The packets are then transmitted to the serial layer 310, which prepares and transfers the packets to the RMM 108. The serial layer 310 transmits the console packets to the RMM one byte at a time. The packet layer 306 and serial layer 310 may be part of the OS 304. Another serial layer 311 and another packet layer 312 on the RMM 108 reassembles the packets 308 and transfers the packets 308 to a console layer 314.

The console layer 314 has several functions. The console layer 314 provides redirection of the administrative data to remote users, stores administrative data into memory such as the RAM 204, allows remote users to view stored console logs, and transmits administrative data to a remote user when a specific event occurs (e.g., when the appliance 102 experiences a reboot). The console layer 314 outputs through the network port 128.

As mentioned above, the firmware 302 operates the appliance 102 when the appliance 102 is first booted. Since system initialization and diagnostics are run while the firmware 302 is controlling the appliance 102, examining administrative data generated by the firmware 302 can often reveal the causes of errors. Additionally, it may be advantageous to view the administrative data that was generated by the OS 304 within a certain amount of time before a system error occurred. Since the RAM 204 (or other memory in which the administrative data are stored) may have limited capacity, the RMM 108 may have to selectively store a portion of the administrative data generated by the firmware 302 and the OS 304.

Figure 4:
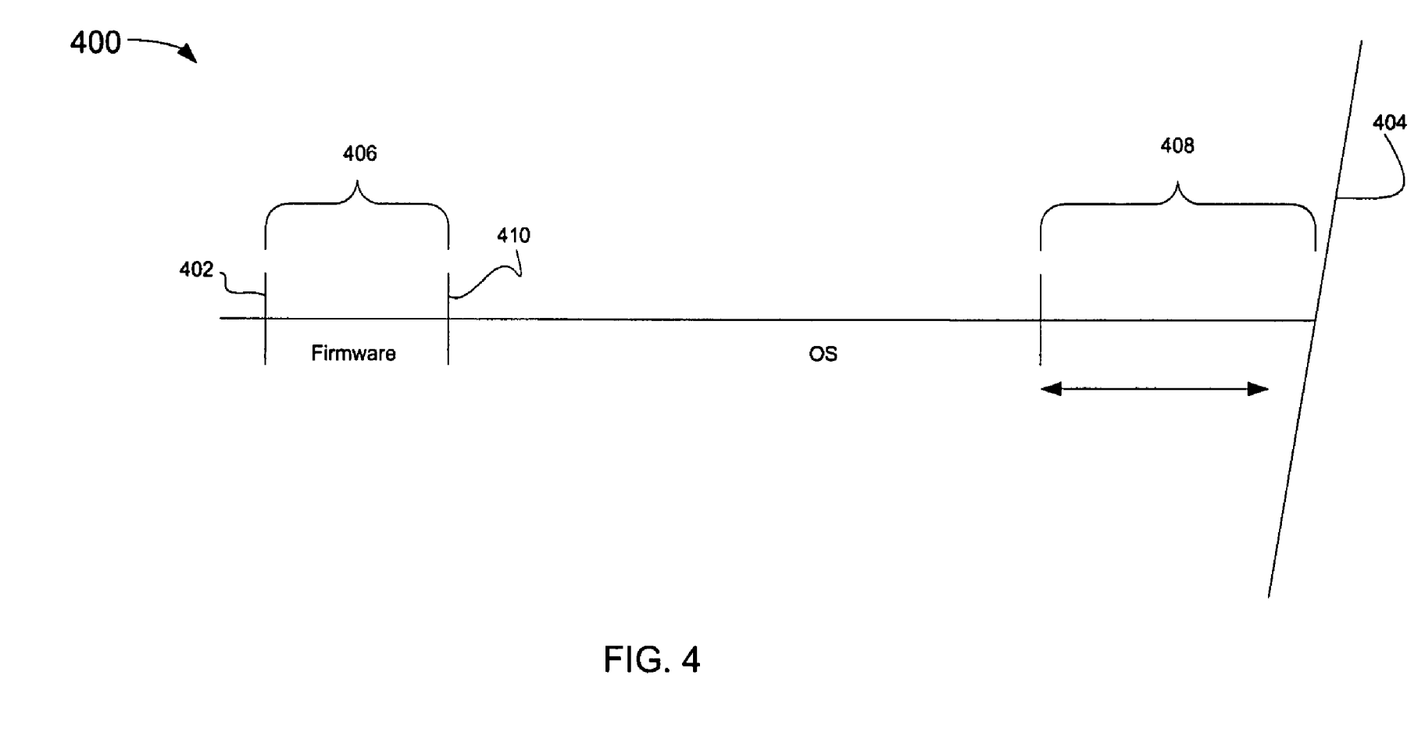
FIG. 4 is a timeline for a subset of administrative data stored by the RLM.

FIG. 4 is a timeline showing a subset of administrative data stored by the RMM 108. The timeline 400 shows the priority given to storing certain administrative data when storing all administrative data generated by an appliance 102 would exceed available memory. The timeline 400 covers a single operational sequence after a boot. At the beginning of the timeline 402, the appliance 102 is booted. At the current time 404, the appliance 102 is still operating under control of the OS 304. According to one embodiment of the invention, administrative data generated during a preboot sequence 406 and during a buffer 408 are stored in the RAM 204.

If not enough memory is available in the RMM 108 to store the entire administrative data stream, the RMM 108 may selectively keep only certain administrative data considered to be more valuable when diagnosing a system failure. For example, administrative data generated by the firmware 302 may report errors that do not immediately lead to a system failure, while older administrative data generated by the OS 304 during routine operation may be less useful.

The preboot sequence 406 executed by the firmware 302 may be quite brief, e.g., ten seconds or less. Therefore, according to one embodiment of the invention, the entirety of the administrative data generated during the preboot sequence 406 is stored in the RAM 204. Since the preboot sequence 406 occurs only for a short period of time compared to the typical operating time of the appliance 102, the entire console stream outputted by the firmware 302 is relatively small and can easily be stored.

The administrative data stream generated by the OS 304 for this specific operational sequence begins at time 410. Since the appliance 102 may operate for days, months, or years without a reboot, the entire administrative data output of the OS 304 may be very large. As will be explained regarding FIG. 5, the portion of the RAM 204 storing administrative data from the appliance 102 may have an upper size limit on the amount of administrative data that will be stored. According to one embodiment, therefore, when the OS 304 generates new administrative data, the oldest data generated by the OS 304 within the current operational sequence is discarded. The buffer 408 illustrates that the RMM 108 stores only a predetermined number of bytes of the most recent administrative data generated by the OS 304, which corresponds roughly to an amount of time. Typically, if a failure occurs because of the OS 304, the failure is indicated in recent administrative data, and older data may be unnecessary. It is understood that in other embodiments of the invention, the entirety of the OS administrative data or other subsets of administrative data may be stored.

Figure 5:
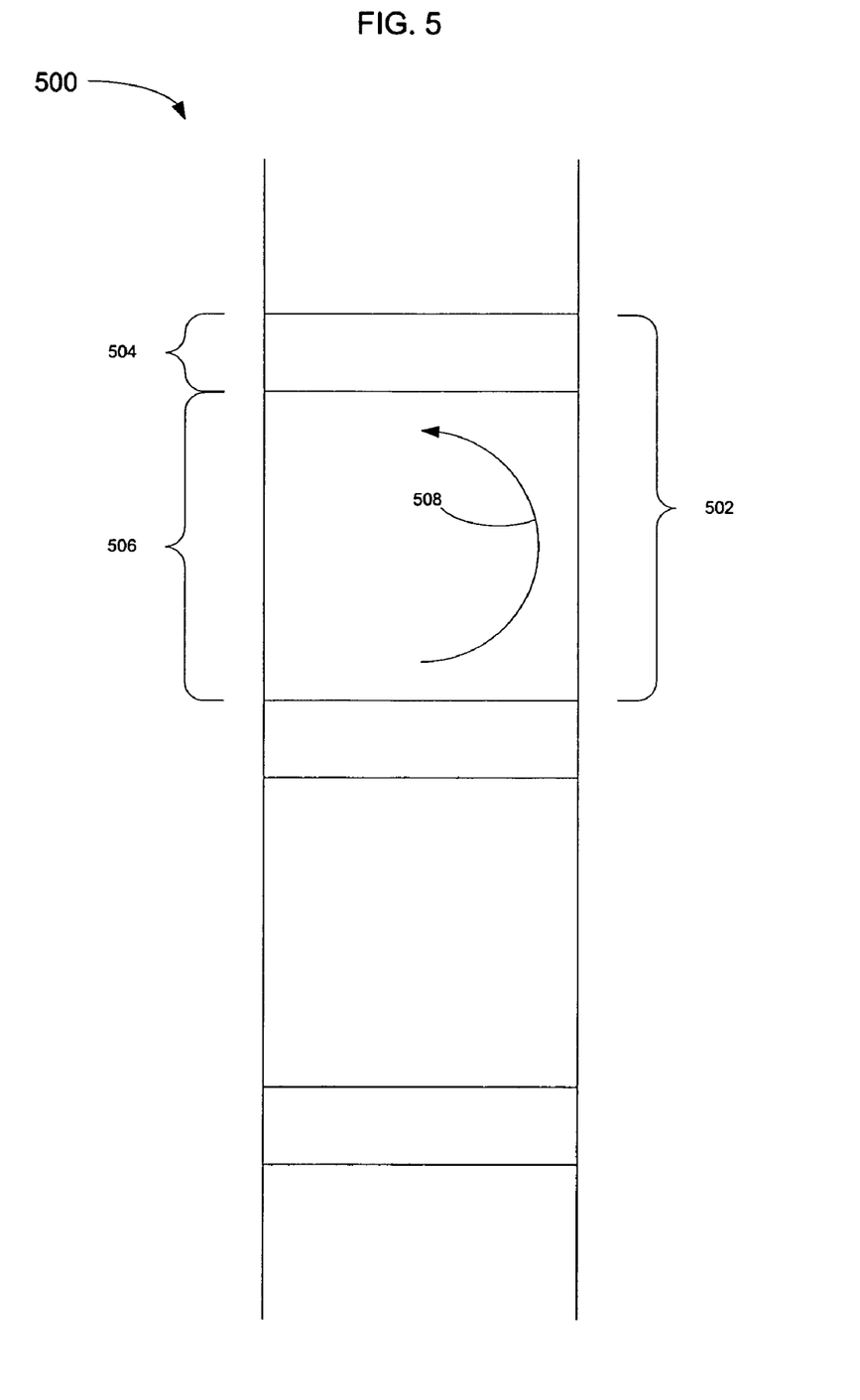
FIG. 5 schematically illustrates administrative data stored in a random access memory (RAM) of the RLM.

FIG. 5 schematically illustrates administrative data stored in the RAM 204 of the RMM 108. A portion 500 of the RAM 204 is used to store administrative data generated by the appliance 102. The portion 500 may have a fixed size in the RAM 204, for example 96 Kilobytes (KB). The portion 500 is divided into partitions 502. Each partition 502 stores the administrative data from a single boot session. When the appliance 102 reboots, a new partition 502 is created. The partition 502 may also have a fixed maximum size, for example, 32 KB. If each partition 502 has reached its maximum size, the hypothetical portion 500 would hold administrative data for three boot sessions. However, since an error condition may cause the appliance 102 to reboot frequently, administrative data from many more boot sessions could be stored in the portion 500.

Each partition 502 is divided into two further sub-partitions, a first sub-partition 504 for storing administrative data generated by the firmware 302, and a second sub-partition 506 for storing administrative data generated by the OS 304. Each of the sub-partitions 504 and 506 may also have a maximum size, for example 10 KB and 22 KB, respectively. During a typical boot session, the firmware 302 may only generate 1 KB of administrative data. However, since the appliance 102 typically runs for extended periods of time without a reboot, the sub-partition 506 is typically filled by administrative data from the OS 304. When the RMM 108 fills the sub-partition 506, the RMM 108 writes over the oldest administrative data in the sub-partition 506, as is indicated by the arrow 508.

It is understood that although the storage of administrative data discussed above uses space limits that no such limits are required, and that a sufficient amount of memory could be used to retain every console output generated by the appliance 102. It is further understood that other memory limits could be used, and that memories other than RAM, such as non-volatile memories, could be used to store administrative data.

According to one embodiment of the invention, the stored administrative data may include timestamps indicating when the administrative data was generated. A timestamp can help determine the amount of time that the appliance 102 was operating before a reboot occurs. The firmware 302 may not output a timestamp when generating administrative data, and the RMM 108 can add the timestamp when the administrative data is received.

Figure 6:
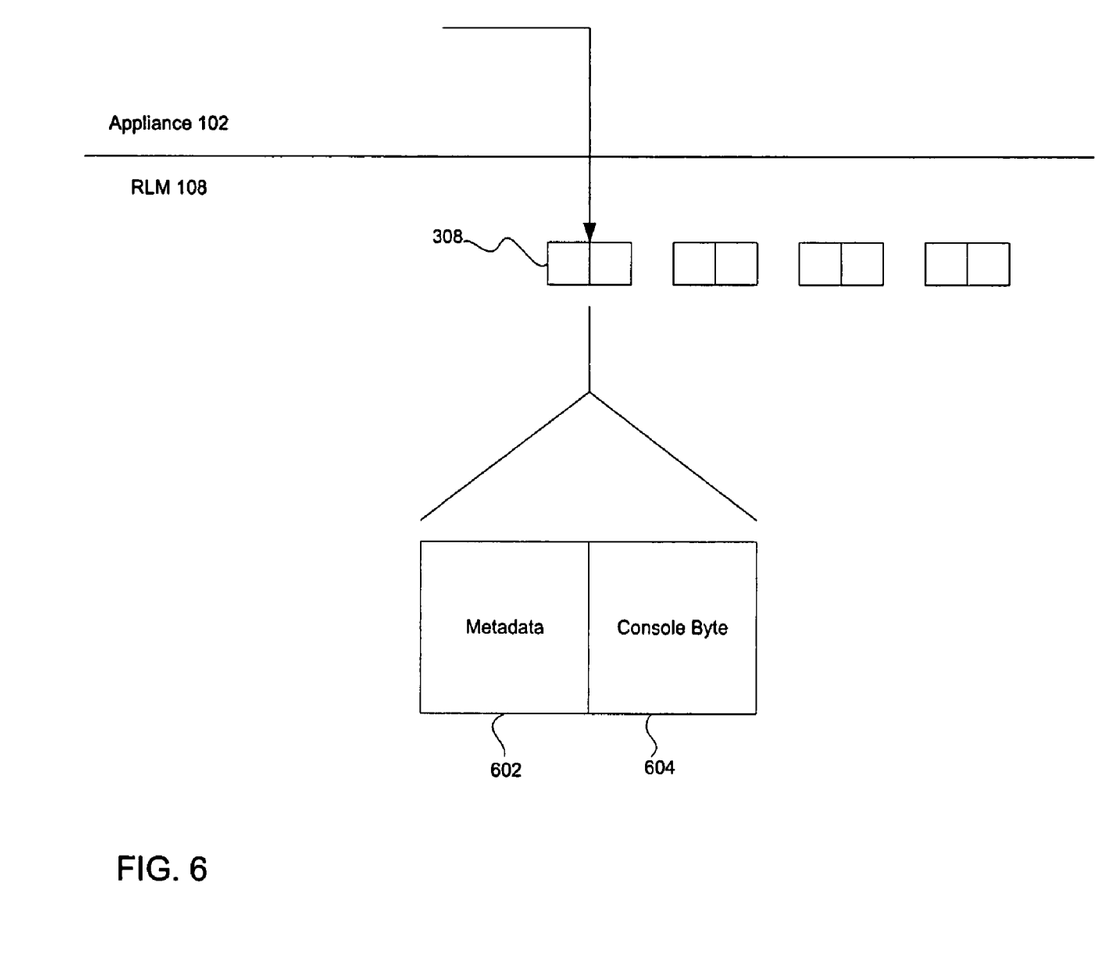
FIG. 6 illustrates the use of metadata to identify the source of administrative data.

FIG. 6 illustrates using metadata to identify the source of administrative data. Each byte of administrative data generated by the appliance 102 has a source. For example, the source of a first byte of administrative data may be the firmware 302, while the source of a second byte of administrative data may be the OS 304. The RMM may be unable to determine the origin of a specific piece of administrative data. Metadata are added to the administrative data by the firmware 302 or the OS 304 to indicate the origin of each byte of administrative data.

As mentioned above, when administrative data are transmitted from the appliance 102 to the RMM 108, the data are packetized before it is sent over the serial link 210, and is again packetized once it is received by the RMM 108. Each packet 308 includes two bytes, a metadata byte 602, and a console byte 604. The console byte 604 is a portion of the administrative data transmitted between the appliance 102 and the RMM 108. Administrative data generated by the firmware 302 is not inherently reliably distinguishable from administrative data generated by the OS 304. However, when administrative data are generated by the appliance 102, the appliance 102 knows which subsystem is responsible for the data (e.g., firmware or OS), and can apply a unique metadata byte to each byte of administrative data to indicate the subsystem in which the data originated. The metadata byte 602 is appended to the administrative data byte 604 in the packet layer 306.

When the administrative data, in the form of packets 308, are received by the RMM 108, the packets 308 are transmitted to the console layer 314. The console layer 314 reads and removes the metadata byte 602, and forwards the corresponding console byte 604 to the appropriate sub-partition 504 or 506 of the RAM 204. The metadata byte 602 ensures that the console byte is properly located.

The metadata byte 602 can also indicate whether the appliance 102 has experienced a reboot. If a packet 308 arrives at the RMM 108 including a metadata byte 602 indicating that the console byte 604 was generated by the firmware 302, the appliance 102 must have rebooted, since the firmware 302 controls the appliance 102 only when the appliance 102 is booting. The RMM 108 can immediately notify a remote administrator that an error condition possibly exists that caused the reboot. The remote administrator can be notified by transmitting the portion 500 to the remote administrator over the network 124 via an e-mail or other message.

Figure 7:
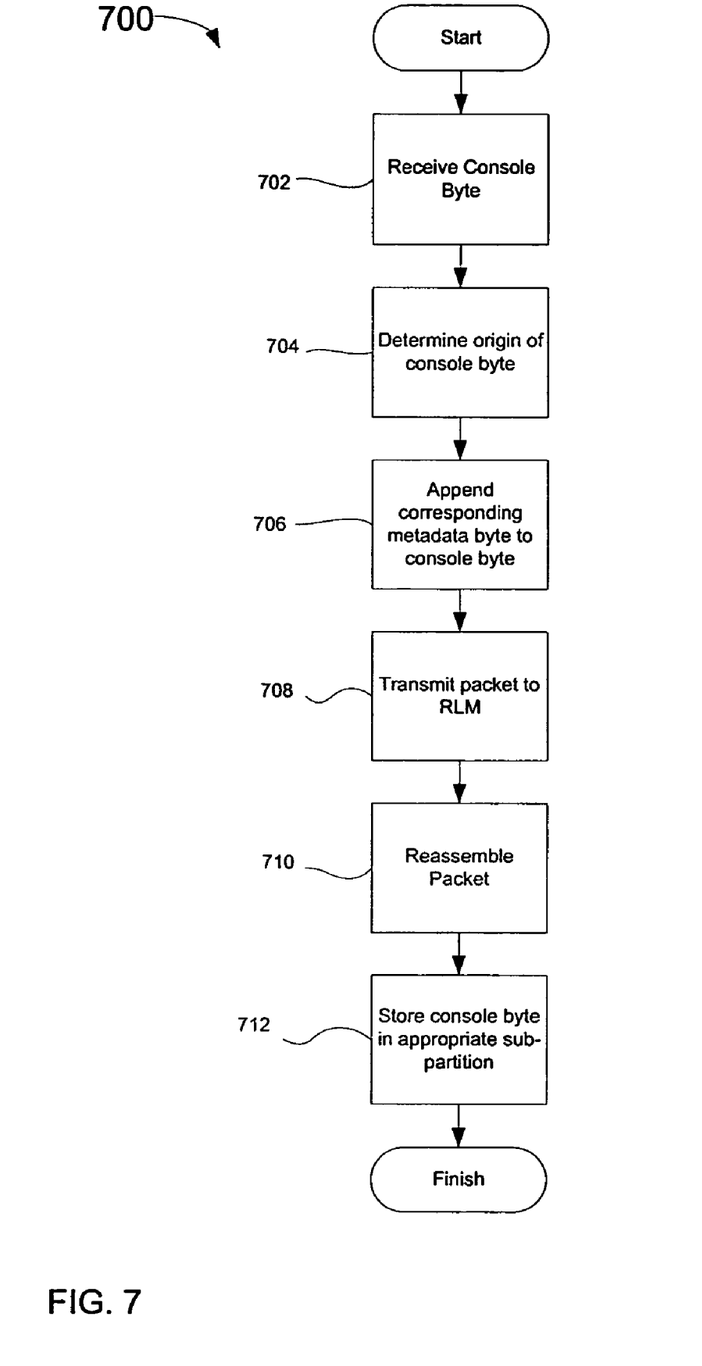
FIG. 7 is a flowchart describing the storage of administrative data by the RLM.

FIG. 7 is a flowchart describing the storage of administrative data by the RMM 108. In block 702, a console byte 604 is intercepted by the appliance 102 to send to the RMM 108. As shown above, the serial connection 126 receives administrative data generated by the appliance 102. In block 704, the origin of the console byte 604 is determined. The console byte 604 may have originated either from the firmware 302 or form the OS 304. In block 706, a metadata byte 604 corresponding to the origin of the console byte is appended to the console byte by the packet layer 306 to form a two-byte packet 308 in the packet layer 306.

In block 708, the packet 308 is transmitted over the serial layer 310 to the RMM 108. The serial layer 310 transmits data one byte at a time. In block 710, the packet 308 is reassembled by the packet layer 312 on the RMM 108. In block 712, the console byte 604 is stored in the appropriate sub-partition 504 or 506, depending on whether the metadata byte 602 indicates that the console byte 604 originated from the firmware 302 or from the operating system 304, respectively.

Figure 8:
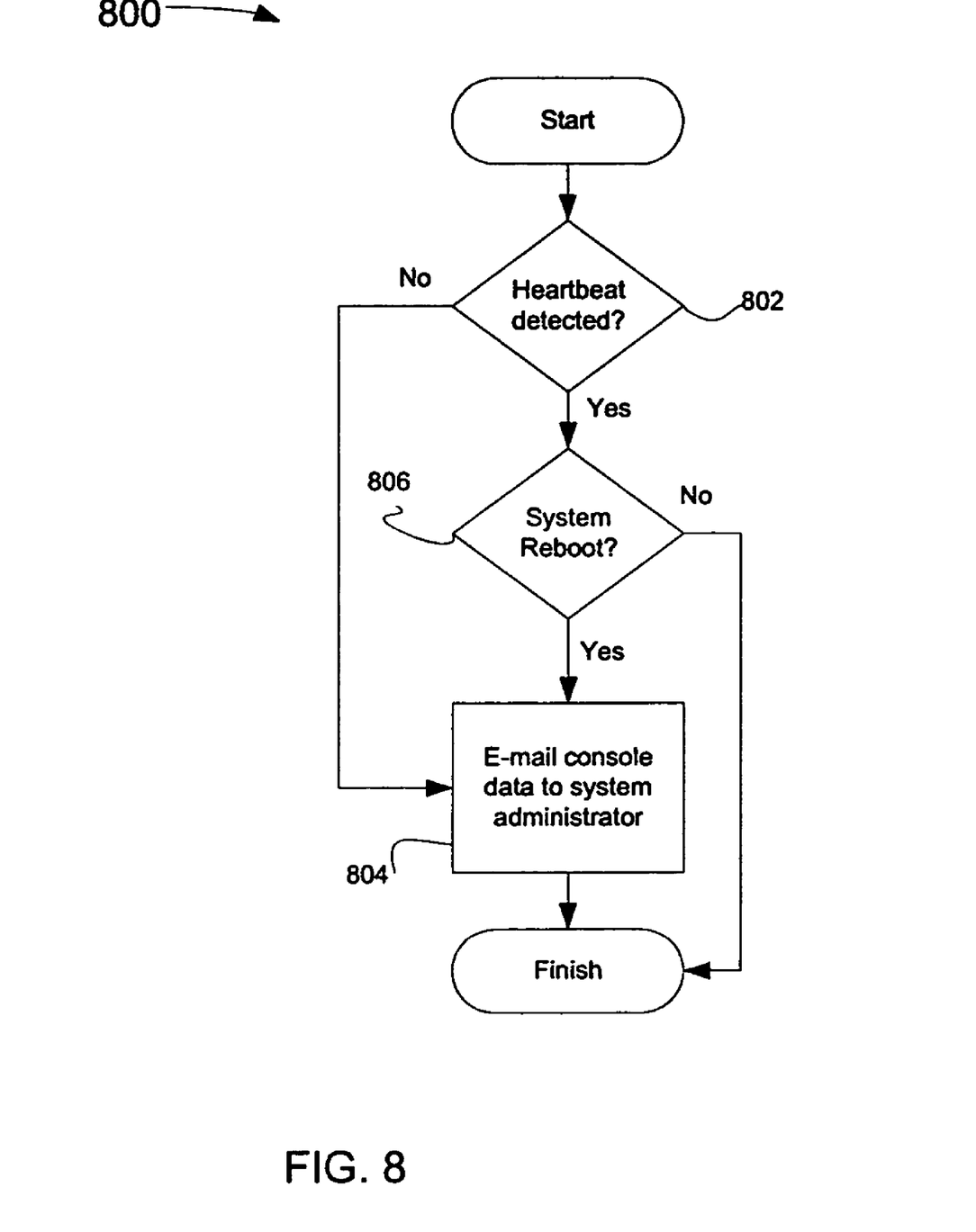
FIG. 8 is a flowchart describing a process for issuing an e-mail to a remote administrator when an error occurs.

FIG. 8 is a flowchart describing a process for issuing an e-mail to a remote administrator when an error occurs. The process 800 describes a procedure executed by the RMM 108 to notify a system administrator of an error condition on the appliance 102. Certain error conditions other than those mentioned here may also trigger a transmission of the administrative data stored in the portion 500.

In block 802, it is determined whether a heartbeat is detected for the appliance 102. As mentioned above, a heartbeat is a signal generated by the appliance 102 to indicate continuous operation of the appliance 102. The heartbeat may be multiplexed over the serial link 210. The lack of a heartbeat is an indication that the appliance 102 is nonfunctional. If there is no heartbeat, in block 804, an e-mail including the administrative data stored in the portion 500 is transmitted to a system administrator or other system to diagnose and repair the problem.

In block 802, if a heartbeat is found, it is determined in block 806 whether any incoming metadata bytes 602 indicate that the attached console byte 604 originated with the firmware 302. If the firmware is generating administrative data, a reboot of the appliance has occurred, and in block 804, an e-mail, including the administrative data stored in the portion 500 is transmitted to a system administrator.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in/with non-distributed file systems. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

The invention claimed is:

1. A method comprising:
   receiving administrative data from a processing system at a remote management device, the remote management device being coupled locally to the processing system to allow remote management of the processing system;
   determining, in the remote management device, that a first portion of the administrative data is from a firmware of the processing system, by using first metadata appended to the first portion;
   determining, in the remote management device, that a second portion of the administrative data is from an operating system of the processing system, by using second metadata appended to the second portion;
   storing at least a portion of the administrative data in a memory in the remote management device, including
      storing the first portion of the administrative data in a first partition of the memory; and
      storing the second portion of the administrative data in a second partition of the memory; and
   making the administrative data in the memory available to a remote system.

2. The method of claim 1, wherein receiving administrative data comprises receiving console data from a console port of the processing system.

3. The method of claim 2, wherein receiving console data comprises receiving the console data through a serial universal asynchronous receiver-transmitter (UART) connection.

4. The method of claim 1, further comprising:
   transmitting the at least a portion of the administrative data to a remote server over a network.

5. The method of claim 4, wherein transmitting comprises e-mailing the at least a portion of the administrative data in response to the processing system rebooting.

6. The method of claim 1, wherein storing at least a portion of the administrative data comprises storing at least a portion of the administrative data when no terminal is monitoring the processing system.

7. The method of claim 1, wherein storing at least a portion of the administrative data comprises:
   establishing a size limit for the administrative data in the memory; and
   storing the administrative data in the memory.

8. The method of claim 7, further comprising:
   overwriting administrative data in the memory when the size limit is reached.

9. A storage server comprising:
   a remote management device to allow remote management of the storage server by a remote terminal, the remote management device including:
      a circuit substrate installed within the storage server;
      a memory disposed on the circuit substrate;
      an interface coupled to the memory and disposed on the circuit substrate, through which to communicate with the storage server;
      a processor disposed on the circuit substrate and configured to store in the memory administrative data generated by and received from the storage server, the processor further configured to
         determine that a first portion of the administrative data is from a firmware of the storage server by using first metadata appended to the first portion; and
         determine that a second portion of the administrative data is from an operating system of the storage server by using second metadata appended to the second portion;
         store the first portion of the administrative data in a first partition of the memory; and
         store the second portion of the administrative data in a second partition of the memory; and
      a network connection disposed on the circuit substrate and configured to make the administrative data remotely available to the remote terminal.

10. The storage server of claim 9, wherein the memory includes at least one partition to store the administrative data, wherein at least one of the first partition and the second partition has a fixed size.

11. The storage server of claim 9, wherein the administrative data is generated by a console port on the storage server.

12. The storage server of claim 9, wherein the remote management device operates on standby power generated by a power supply of the storage server.

13. The storage server of claim 9, wherein the administrative data is transmitted over a serial connection between the interface and the storage server.

14. The storage server of claim 13, wherein the administrative data is packetized by a packet layer when it is transmitted through the serial interface.

15. The storage server of claim 14, wherein each packet generated by the packet layer includes a metadata byte and a console byte, and wherein the metadata byte indicates whether the console byte was generated by the firmware or by the operating system.

16. A method for storing administrative data comprising:
   intercepting, in a processing system, a portion of administrative data to be outputted by the processing system;
   determining, in the processing system, whether a source of the portion of administrative data is firmware of the processing system or an operating system of the processing system;
   in response to determining whether the source of the portion of administrative data is firmware of the processing system or an operating system of the processing system, appending metadata to the portion of administrative data to create a packet, the metadata indicating the source of the portion of administrative data; and
   transmitting the packet from the processing system to a remote management device located within the processing system, the remote management device to allow remote management of the processing system.

17. The method of claim 16, further comprising:
   storing the packet in a memory of the remote management device.

18. The method of claim 17, further comprising:
   determining the source of the portion of administrative data by examining the metadata;
   wherein storing the packet in a memory comprises storing the packet in a partition of the memory corresponding to the source.

19. The method of claim 16, further comprising:
   determining whether the processing system is operational; and
   e-mailing a remote administrator if the processing system is not operational.

20. The method of claim 19, wherein determining whether the processing system is operational comprises monitoring a signal indicating that the processing system is operational.

21. The method of claim 16, further comprising:
   determining whether the processing system has rebooted; and
   e-mailing a remote administrator if the system has rebooted.

22. The method of claim 21, wherein determining whether the system has rebooted comprises examining the metadata to determine whether the portion of administrative data was generated by a firmware of the processing system.

23. The method of claim 21, wherein e-mailing a remote administrator comprises e-mailing stored administrative data to the remote administrator.

24. A machine readable storage medium having stored thereon executable program code which, when executed, causes a machine to perform a method for remotely monitoring a processing system, the method comprising:
   receiving administrative data from the processing system at a remote management device, the remote management device being coupled locally to the processing system to allow remote management of the processing system;
   identifying a first portion of the administrative data as being from a firmware of the processing system, by using first metadata appended to the first portion;
   identifying a second portion of the administrative data as being from an operating system of the processing system, by using second metadata appended to the second portion;
   storing at least a portion of the administrative data in a memory in the remote management device, including
      storing the first portion of the administrative data in a first partition of a memory in the remote management device; and
      storing the second portion of the administrative data in a second partition of the memory in the remote management device; and
   making the administrative data in the memory available to a remote terminal.

25. The machine readable medium of claim 24, wherein storing at least a portion of the administrative data comprises:
   establishing a size limit for the administrative data in the memory; and
   storing the administrative data in the memory.

26. A remote management module for use in a processing system to allow management or monitoring of the processing system by a remote terminal, the remote management module comprising:
   a circuit substrate designed for installation within the processing system;
   a communication interface disposed on the circuit substrate, through which the remote management module can communicate with the processing system;
   a network interface disposed on the circuit substrate, through which the remote management module can communicate with the remote terminal over a network;
   a memory disposed on the circuit substrate; and
   a processor disposed on the circuit substrate and coupled to the communication interface, the network interface and the memory, the processor configured to control operations of the remote management module, such that the remote management module receives administrative data from the processing system, the administrative data including first administrative data generated by firmware of the processing system and corresponding first metadata appended to the first administrative data to indicate that the first administrative data was generated by the firmware of the processing system, the administrative data further including second administrative data generated by an operating system of the processing system and corresponding second metadata data appended to the second administrative data to indicate that the second administrative data was generated by the operating system of the processing system, wherein the remote management module uses the first metadata to determine that the first administrative data is from the firmware and uses the second metadata to determine that the second administrative data is from the operating system, and wherein the remote management further stores the first administrative data in a first partition of the memory and stores the second administrative data in a second partition of the memory, and wherein the remote management module is operable to make the first administrative data and the second administrative data available to the remote terminal even when the processing system is inoperable.

27. The remote management module of claim 26, wherein the processing system is a storage server for providing network storage services to a plurality of clients.

28. The remote management module of claim 26, wherein the remote management module is configured to store administrative data from a plurality of boot sessions of the processing system in separate partitions of the memory.

* * * * *